United States Patent
Chang et al.

(10) Patent No.: US 10,542,247 B2
(45) Date of Patent: Jan. 21, 2020

(54) 3D IMAGE CAPTURE METHOD AND SYSTEM

(71) Applicant: Wistron Corporation, New Taipei (TW)

(72) Inventors: Yao-Tsung Chang, New Taipei (TW); Chuan-Yen Kao, New Taipei (TW)

(73) Assignee: Wistron Corporation, New Taipei (TW)

(*) Notice: Subject to any disclaimer, the term of this patent is extended or adjusted under 35 U.S.C. 154(b) by 169 days.

(21) Appl. No.: 15/862,560

(22) Filed: Jan. 4, 2018

(65) Prior Publication Data

US 2019/0191145 A1    Jun. 20, 2019

(30) Foreign Application Priority Data

Dec. 20, 2017 (TW) .............................. 106144775 A

(51) Int. Cl.
| | |
|---|---|
| *H04N 13/246* | (2018.01) |
| *H04N 13/243* | (2018.01) |
| *H04N 13/25* | (2018.01) |
| *H04N 13/239* | (2018.01) |
| *H04N 5/33* | (2006.01) |

(52) U.S. Cl.
CPC .......... *H04N 13/246* (2018.05); *H04N 5/33* (2013.01); *H04N 13/239* (2018.05); *H04N 13/243* (2018.05); *H04N 13/25* (2018.05)

(58) Field of Classification Search
CPC .... H04N 13/246; H04N 13/239; H04N 13/25; H04N 13/243; H04N 5/33
See application file for complete search history.

(56) References Cited

U.S. PATENT DOCUMENTS

| | | | |
|---|---|---|---|
| 2003/0035100 A1 | 2/2003 | Dimsdale et al. | |
| 2011/0222757 A1 | 9/2011 | Yeatman, Jr. et al. | |
| 2014/0300704 A1* | 10/2014 | Ramaswamy | G06T 7/85 348/48 |

FOREIGN PATENT DOCUMENTS

| | | |
|---|---|---|
| CN | 104519332 B | 7/2017 |
| TW | I234640 B | 6/2005 |

OTHER PUBLICATIONS

Office Action dated Dec. 11, 2018 in corresponding Taiwan Patent Application No. 106144775.

* cited by examiner

*Primary Examiner* — Huy T Nguyen
(74) *Attorney, Agent, or Firm* — Donald E. Stout; Stout, Uxa & Buyan, LLP

(57) ABSTRACT

A 3D image capture method includes selecting a plurality of different pairs of image capture devices, of which distance errors relevant to an object are determined, the distance error being a distance between a measured position and a real position of the object; selecting a pair of image capture devices with a minimum distance error; and obtaining 3D information according to spacing and angles of view of the selected pair of image capture devices.

18 Claims, 12 Drawing Sheets

300B

300C

| area | area 1 | area 2 | area 3 | area 4 | ... | area x |
|---|---|---|---|---|---|---|
| coordinate | coordinate 1 | coordinate 2 | coordinate 3 | coordinate 4 | ... | coordinate x |
| most accurate pair of image capture devices | A,B | A,B | A,C | A,C | | B,C |

700B

700C

3D IMAGE CAPTURE METHOD AND SYSTEM

CROSS-REFERENCE TO RELATED APPLICATIONS

This application claims priority of Taiwan Patent Application No. 106144775, filed on Dec. 20, 2017, the entire contents of which are hereby incorporated by reference.

BACKGROUND OF THE INVENTION

1. Field of the Invention

The present invention generally relates to image capturing, and more particularly to a three-dimensional (3D) image capture system and method.

2. Description of Related Art

Conventional cameras can only capture two-dimensional (2D) images, which cannot show the third-dimensional information such as depth. The 2D images may be processed to imitate 3D depth information. The imitated 3D information possesses errors that are too large to be used in applications (e.g., autonomous cars, unmanned aerial vehicle, virtual reality or augmented reality) requiring high-accuracy control.

3D cameras are commonly used to obtain accurate depth information. Dual camera is one type of 3D camera that uses two cameras to capture images, disparity of which is utilized to calculate depth information. FIG. 1A shows a schematic diagram illustrating a 3D camera, which includes a left camera L and a right camera R. Each camera L/R includes a lens 11 and an image sensor 12 (e.g., a complementary metal-oxide-semiconductor (CMOS) image sensor). Spacing between the left camera L and the right camera R is D, the left camera L has an angle of view θ1 with respect to an object O, and the right camera R has an angle of view θ2 with respect to the object O. The depth information of the object O may be obtained by using trigonometry.

FIG. 1B shows a schematic diagram illustrating another 3D camera, which includes an infrared (IR) projector 13 and an IR camera 14. The IR camera 14 includes a lens 141 and an image sensor 142 (e.g., an IR image sensor). Spacing between the IR projector 13 and the IR camera 14 is D, the IR camera 14 has an angle of view θ1 with respect to an object O, and the IR projector 13 has a projecting angle θ2 with respect to the object O. The depth information of the object O may be obtained by using trigonometry.

The capturing area of either the dual camera (FIG. 1A) or the IR 3D camera (FIG. 1B) is smaller than the capturing area of conventional 2D cameras. FIG. 1C schematically shows the capturing area of a 3D camera. Character A represents the left camera L or the IR camera 14, and character B represents the right camera R or the IR projector 13. An overlapped area (in shadow) between a field of view (FOV) of a device A and an FOV (or projecting area) of a device B is the capturing area of a 3D camera. Spacing between the device A and the device B affects the size of the capturing area. For example, the capturing area becomes smaller with reduced overlapped area when the spacing increases.

Conventional dual camera (FIG. 1A) or IR 3D camera (FIG. 1B) possesses system errors. Further, the spacing between two cameras in the dual camera or the spacing between the IR projector and the IR camera in the IR 3D camera also causes system errors.

A need has arisen to propose a novel 3D camera with higher accuracy adaptable to applications requiring high-accuracy control.

SUMMARY OF THE INVENTION

In view of the foregoing, it is an object of the embodiment of the present invention to provide a three-dimensional (3D) image capture system and method capable of effectively reducing system errors and substantially enhancing accuracy of 3D information.

According to one embodiment, a plurality of different pairs of image capture devices are selected, of which distance errors relevant to an object are determined, the distance error being a distance between a measured position and a real position of the object. A pair of image capture devices with a minimum distance error is selected. 3D information is obtained according to spacing and angles of view of the selected pair of image capture devices.

DETAILED DESCRIPTION OF THE INVENTION

Figure 2:
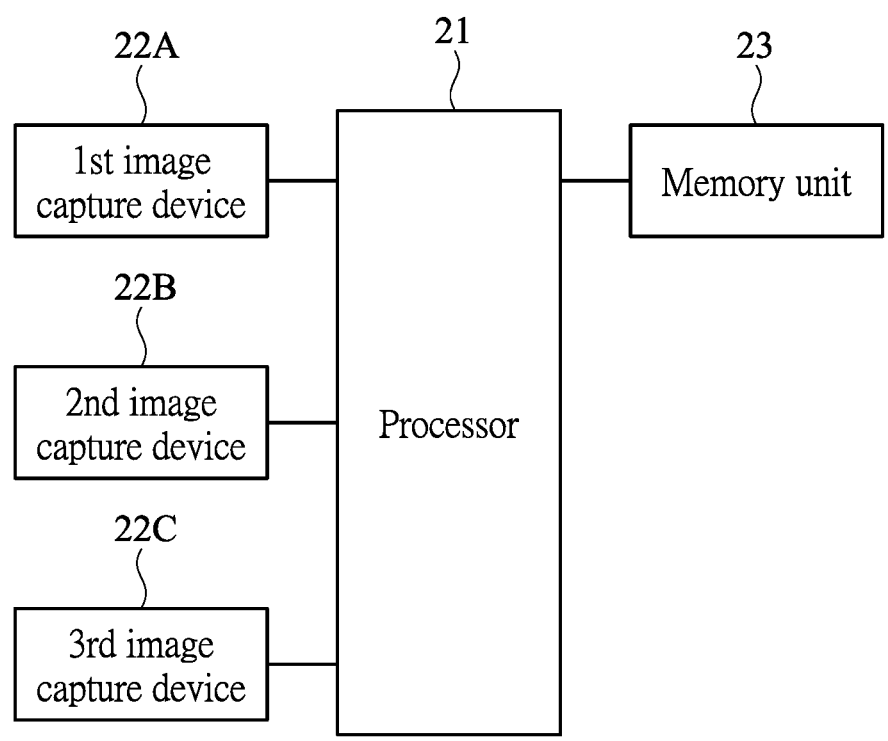
FIG. 2 shows a block diagram illustrating a 3D image capture system according to a first embodiment of the present invention.

FIG. 2 shows a block diagram illustrating a three-dimensional (3D) image capture system 200 according to a first embodiment of the present invention. In the embodiment, the 3D image capture system 200 may include a processor 21 (e.g., an image processor) and at least three (visible light) image capture devices, for example, a first image capture device 22A, a second image capture device 22B and a third image capture device 22C. The processor 21 controls the first image capture device 22A, the second image capture device 22B and the third image capture device 22C to capture images, according to which 3D information may be obtained. The 3D image capture system 200 of the embodiment may also include a memory unit 23 configured to store computer programs executable by the processor 21 and the obtained 3D information. The memory unit 23 may include a memory device such as dynamic random-access memory (DRAM), static random-access memory (SRAM) or other memory devices adaptable to store programs and 3D information.

Figure 1A:
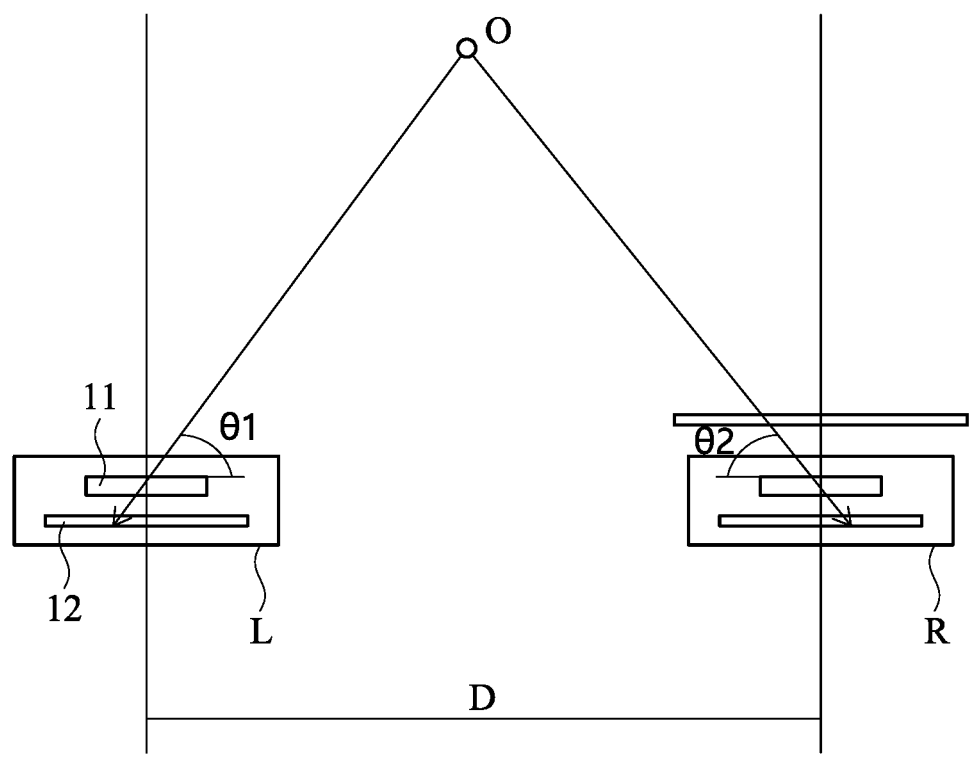
FIG. 1A shows a schematic diagram illustrating a 3D camera.
Figure 3A:
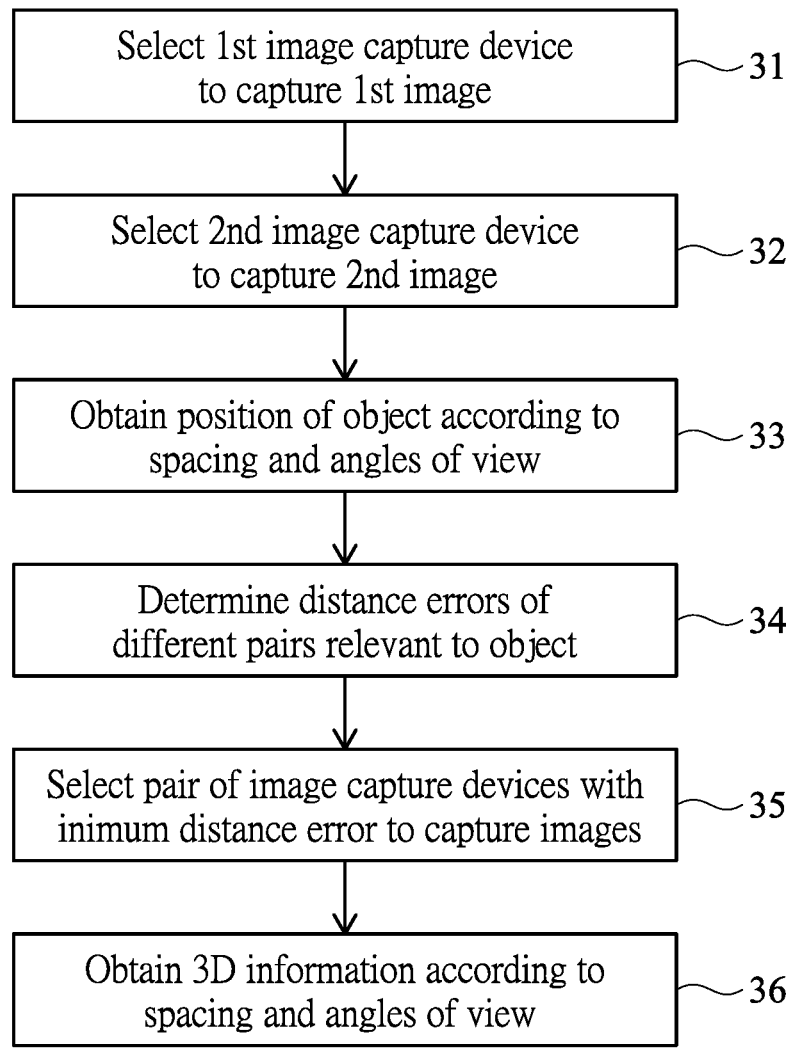
FIG. 3A shows a flow diagram illustrating a 3D image capture method according to the first embodiment of the present invention.

FIG. 3A shows a flow diagram illustrating a 3D image capture method 300A according to the first embodiment of the present invention. In step 31, the first image capture device 22A is selected to capture a first image. In step 32, the second image capture device 22B is selected to capture a second image. Next, in step 33, a first angle of view and a second angle of view of corresponding image capture devices are determined respectively according to the first image and the second image. Accordingly, depth information (e.g., position) of an object may be obtained according to the first angle of view, the second angle of view, and spacing between the first image capture device 22A and the second image capture device 22B by using trigonometry (as exemplified in FIG. 1A). The measured position of the object obtained in step 33, however, may be different from a real position due to errors of the image capture system.

Figure 4A:
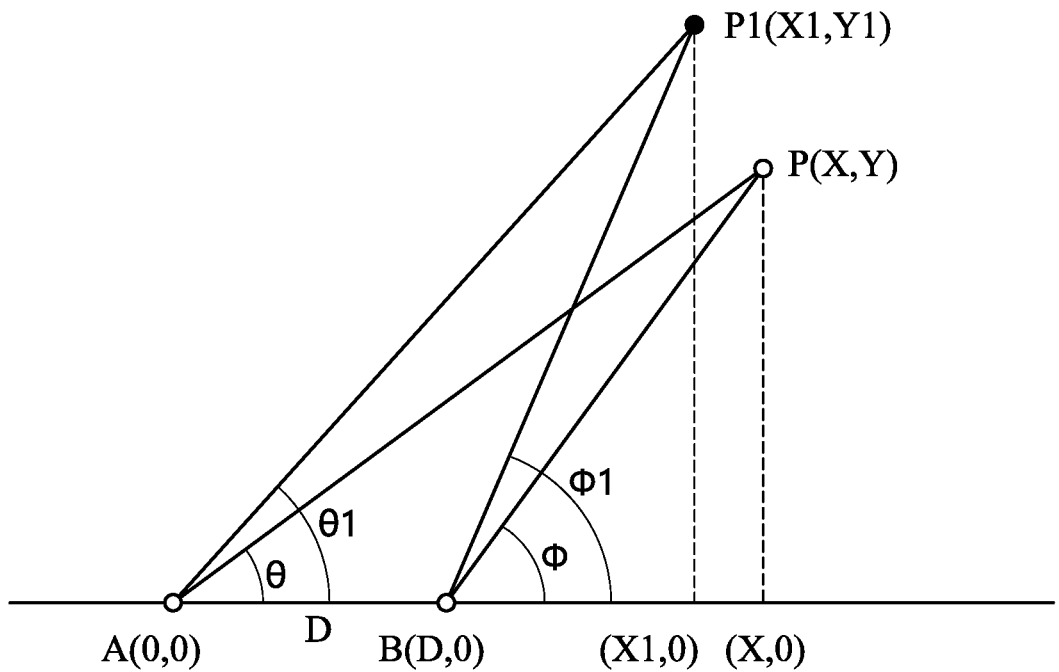
FIG. 4A schematically shows a method of determining a distance error relevant to an object.

According to one aspect of the embodiment, in step 34, distance errors between the measured position and the real position relevant to the object are determined. FIG. 4A schematically shows a method of determining a distance error relevant to an object. The first image capture device 22A is located at A (as an origin), and the second image capture device 22B is located at B with spacing D therebetween. P1(X1,Y1) is the real position of the object, and real angles of view corresponding to the first image capture device 22A and the second image capture device 22B are θ1 and Ø1, respectively. Due to errors of the image capture system, P(X,Y) is the measured position of the object, and measured angles of view corresponding to the first image capture device 22A and the second image capture device 22B are θ and Ø, respectively.

As the spacing D, the measured angles of view θ and Ø are known, the following relations may be obtained by using trigonometry:

$$\mathrm{Tan}(\theta) = \frac{Y}{X} \Rightarrow Y = X\,\mathrm{Tan}(\theta)$$

$$\mathrm{Tan}(\phi) = \frac{Y}{X - D} \Rightarrow Y = (X - D)\mathrm{Tan}(\phi) \Rightarrow X\,\mathrm{Tan}(\theta) = \quad (1)$$

$$(X - D)\mathrm{Tan}(\phi) \Rightarrow X\mathrm{Tan}(\theta) = X\,\mathrm{Tan}(\phi) - D\,\mathrm{Tan}(\phi) \Rightarrow X =$$

$$D\,\mathrm{Tan}(\phi)/(\mathrm{Tan}(\phi) - \mathrm{Tan}(\theta)) \Rightarrow$$

$$Y = X\,\mathrm{Tan}(\theta) = D(\mathrm{Tan}(\phi) * \mathrm{Tan}(\theta))/(\mathrm{Tan}(\phi) - \mathrm{Tan}(\theta)) \quad (2)$$

where the measured position P(X,Y) of the object may be obtained according to D, θ and Ø.

Similarly, the real position P1(X1,Y1) of the object may be expressed as follows:

$$\Rightarrow X1 = D\,\mathrm{Tan}(\emptyset 1)/(\mathrm{Tan}(\emptyset 1) - \mathrm{Tan}(\theta 1)) \quad (3)$$

$$\Rightarrow Y1 = X1\,\mathrm{Tan}(\theta 1) = D(\mathrm{Tan}(\emptyset 1) * \mathrm{Tan}(\theta 1))/\mathrm{Tan}(\emptyset 1) - \mathrm{Tan}(\theta 1)) \quad (4)$$

where θ1=θ+Δf, Ø1=Ø+ΔØ, Δθ represents a first angle of view error, and ΔØ represents a second angle of view error.

As shown in FIG. 4A, a distance error ΔP is equal to a distance between the real position P1(X1,Y1) and the measured position P(X,Y) expressed as follows:

$$\Delta P = \sqrt{(X1-X)2 + (Y1-Y)2} \quad (5)$$

where ** represents the exponent.

By substituting formulas (1), (2), (3) and (4) into formula (5), we can obtain the distance error ΔP being a function of θ and Ø denoted as f(θ,Ø). The function f(θ,Ø) with respect to Δθ and ΔØ becomes the differential. When Δθ and ΔØ approach zero, the derivative of the function f(θ,Ø) is the differentiation:

$$\Delta(f(\theta, \phi))/\Delta\theta\Delta\phi \quad (6)$$

$$d(f(\theta, \phi))/d\theta d\phi = \lim_{\Delta\theta \to 0} \lim_{\Delta\phi \to 0} \Delta(f(\theta, \phi))/\Delta\theta\Delta\phi$$

where the distance error between the measured position P and the real position P1 can be obtained by substituting D, θ and Ø into formula (6), and greater distance error means lower accuracy.

If the first angle of view error Δθ and the second angle of view error ΔØ are known, the distance error ΔP may be directly obtained by using formula (5) instead of differentiation. That is, the distance error ΔP may be obtained by substituting formulas (1), (2), (3) and (4) into formula (5), where θ1=θ+Δθ, Ø1=Ø+ΔØ.

Figure 4B:
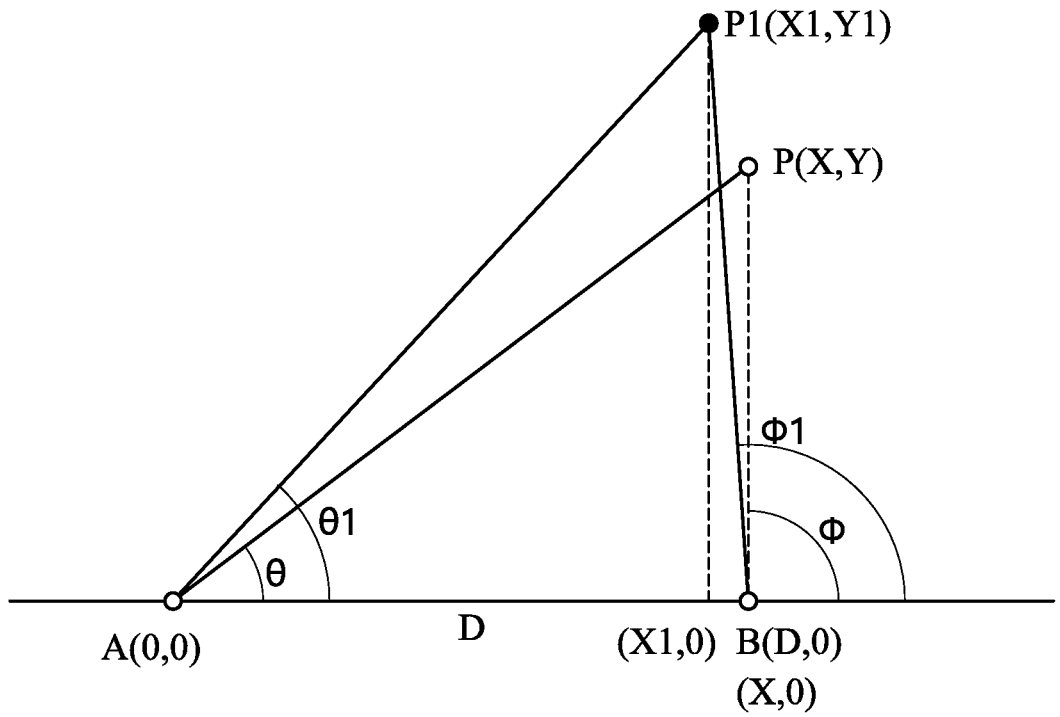
FIG. 4B schematically shows another method of determining a distance error relevant to an object.

FIG. 4B schematically shows another method of determining a distance error relevant to an object, where the measured angle of view of one image capture device is a right angle (e.g., Ø=90°). In this case, the distance error may be calculated by using formula (5). Formulas (1)-(4) may be arranged into the following:

$$X = D\frac{\mathrm{Tan}(\phi)}{\mathrm{Tan}(\phi) - \mathrm{Tan}(\theta)} \Rightarrow X = \quad (1)$$

$$D\frac{\mathrm{Tan}(90°)}{\mathrm{Tan}(90°) - \mathrm{Tan}(\theta)} = D\frac{\mathrm{Sin}(90°)}{(\mathrm{Sin}(90°) - \mathrm{Tan}(\theta) * \mathrm{Cos}(90°))} = D$$

$$Y = X\,\mathrm{Tan}(\theta) \Rightarrow Y = X\,\mathrm{Tan}(\theta) = D\,\mathrm{Tan}(\theta) \quad (2)$$

$$X1 = D\frac{\mathrm{Tan}(\phi 1)}{\mathrm{Tan}(\phi 1) - \mathrm{Tan}(\theta 1)} \Rightarrow X1 = D\frac{\mathrm{Tan}(\phi 1)}{\mathrm{Tan}(\phi 1) - \mathrm{Tan}(\theta 1)} = \quad (3)$$

$$D\frac{\mathrm{Tan}(90° + \Delta\phi)}{\mathrm{Tan}(90° + \Delta\phi) + \mathrm{Tan}(\theta 1)} = D * \frac{\mathrm{Cot}(\Delta\phi)}{\mathrm{Cot}(\Delta\phi) - \mathrm{Tan}(\theta 1)}$$

-continued $$Y1 = X1\operatorname{Tan}(\theta 1) = D\operatorname{Tan}(\theta 1) * \frac{\operatorname{Cot}(\Delta\phi)}{\operatorname{Cot}(\Delta\phi) - \operatorname{Tan}(\theta 1)} \quad (4)$$

Figure 4C:
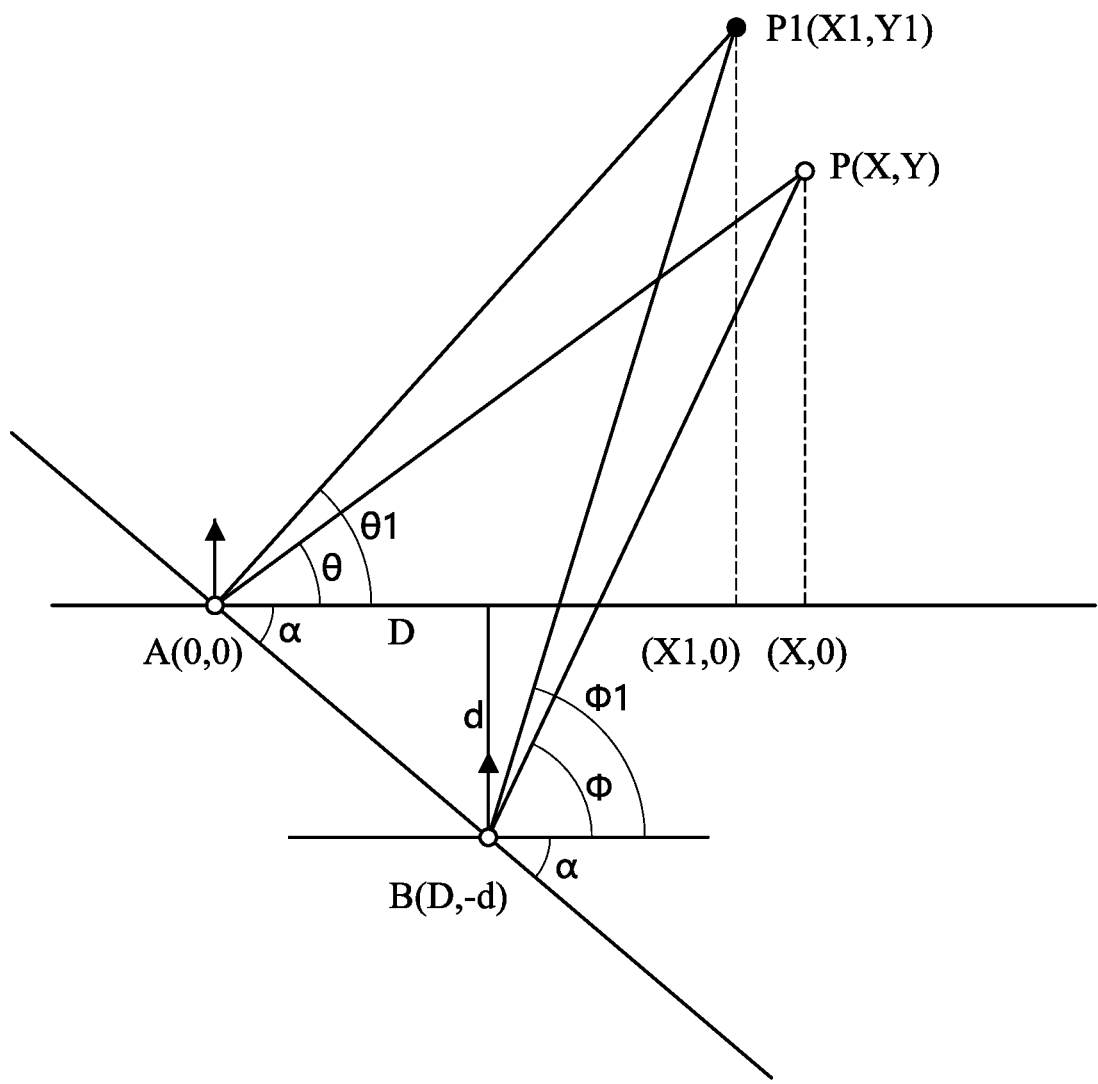
FIG. 4C schematically shows a further method of determining a distance error relevant to an object.

FIG. 4C schematically shows a further method of determining a distance error relevant to an object, where the image capture devices do not perform measurement with the same reference line. As shown in FIG. 4C, a measured first angle of view of the image capture device located at A is θ, and a measured second angle of view of the image capture device located at B is Ø, with spacing D therebetween. By using a line connected between A and B as a new reference line and rotating the original coordinate system with angle α, we can obtain a new first angle of view as θ+α, a new second angle of view as Ø+α, and new spacing as √D2+d2, where the rotation angle α=tan$^{-1}$ d/D, d represents a side opposite the rotation angle α, and the angle between the side d and the spacing D is the right angle.

Referring back to FIG. 3A, different pairs of image capture devices (e.g., a pair composed of the first image capture device 22A and the third image capture device 22C) are selected, and distance errors are respectively determined. At least two different pairs of image capture devices are selected in the embodiment. The number of pairs of image capture devices may be determined according to the number of image capture devices available in the 3D image capture system 200 and application requirements.

In step 35, a pair of image capture devices with a minimum distance error is selected to capture images. Next, in step 36, angles of view of corresponding image capture devices are determined. Accordingly, depth information may be obtained according to the spacing and angles of view of the two image capture devices by using trigonometry (as exemplified in FIG. 1A).

Figures 5A, 5B:
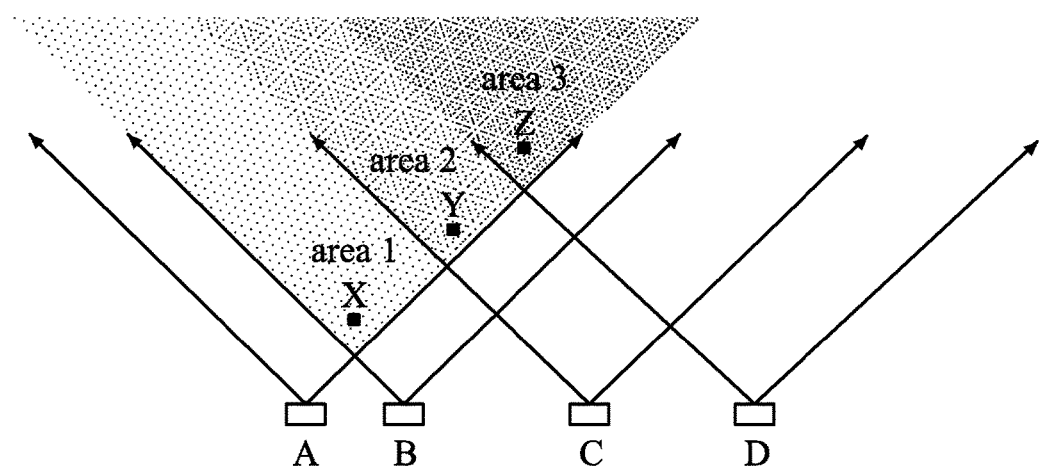
FIG. 5A shows an exemplary table including a most accurate pair of image capture devices for each area.
FIG. 5B exemplifies FOVs and overlapped FOVs of a plurality of image capture devices.

In another embodiment, a field of view (FOV) of the 3D image capture system 200 is divided into a plurality of areas. For each area, distance errors of different pairs of image capture devices are determined (step 34), followed by selecting a (most accurate) pair of image capture devices with a minimum distance error (step 35). FIG. 5A shows an exemplary table that includes plural areas and corresponding coordinates, with a most accurate pair of image capture devices for each area. A user may look up the table (as a lookup table) of FIG. 5A to use the most accurate pair of image capture devices associated with the area to be measured.

According to characteristics of image capturing, a distance error (of a subject) is in proportion to spacing (between image capture devices). For example, the distance error of the subject is A d, when the spacing between the two image capture devices is D and the subject is at a distance d from the image capture devices. The distance error of the subject becomes 4Δd, when the spacing between the two image capture devices is 4D and the subject is at a distance 4d from the image capture devices. It is noted that the distance error is greater than 4Δd if the spacing between the two image capture devices is D and the subject is at a distance 4d from the image capture devices. When the subject to be captured is located in an overlapped FOV area between two image capture devices, the nearer to the image capture devices is the subject, the smaller is the distance error. Accordingly, in a further embodiment, vertices of overlapped FOV (i.e., capturing area) of different pairs of image capture devices are first determined. A user may select a pair of image capture devices having a vertex of overlapped FOV nearest to the subject to be captured. FIG. 5B exemplifies FOVs and overlapped FOVs of a plurality of image capture devices (e.g., A, B, C and D). If the user is capturing an image of subject X, the pair of image capture devices (A,B) is selected because the associated vertex of overlapped FOV (i.e., area 1) is nearest to the subject X. Similarly, if the user is capturing an image of subject Y (located in area 2), the pair of image capture devices (A,C) is selected. If the user is capturing an image of subject Z (located in area 3), the pair of image capture devices (A,D) is selected. In this embodiment, distance errors of different pairs of image capture devices (step 34) need not be determined.

Figure 3B:
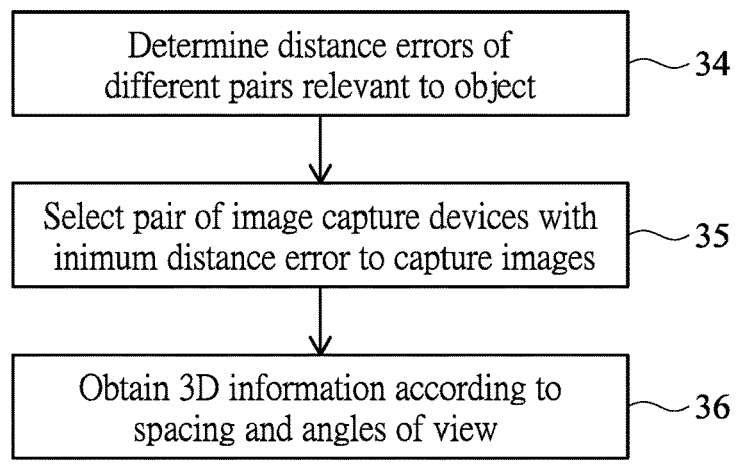
FIG. 3B shows a flow diagram illustrating a 3D image capture method according to a variant first embodiment of the present invention.

FIG. 3B shows a flow diagram illustrating a 3D image capture method 300B according to a variant first embodiment of the present invention. The present embodiment is similar to the embodiment shown in FIG. 3A with the exception that the position of the object is provided by other schemes or techniques. Therefore, the present embodiment includes no corresponding steps 31-33, while steps 34-36 of the present embodiment are the same as those of the embodiment shown in FIG. 3A.

Figure 3C:
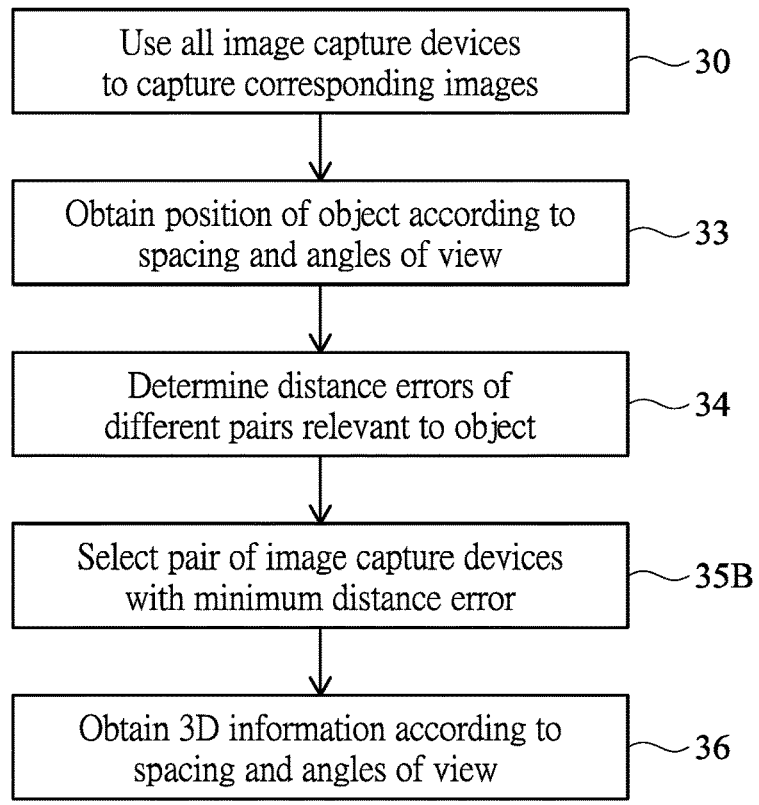
FIG. 3C shows a flow diagram illustrating a 3D image capture method according to another variant first embodiment of the present invention.

FIG. 3C shows a flow diagram illustrating a 3D image capture method 300C according to another variant first embodiment of the present invention. The present embodiment is similar to the embodiment shown in FIG. 3A with the exception as described below. According to the present embodiment, in step 30, all image capture devices are used to capture corresponding images. Next, in step 33, depth information (e.g., position) of an object may be obtained according to spacing and angles of view of two image capture devices by using trigonometry (as exemplified in FIG. 1A). In step 34, distance errors between the measured position and the real position relevant to the object are determined. Subsequently, in step 35B, a pair of image capture devices with a minimum distance error is selected. As the images of all the image capture devices are captured in step 30, step 35B in the present embodiment need not capture images again. Finally, in step 36, depth information may be obtained according to the spacing and angles of view of the two image capture devices by using trigonometry (as exemplified in FIG. 1A).

Figure 6:
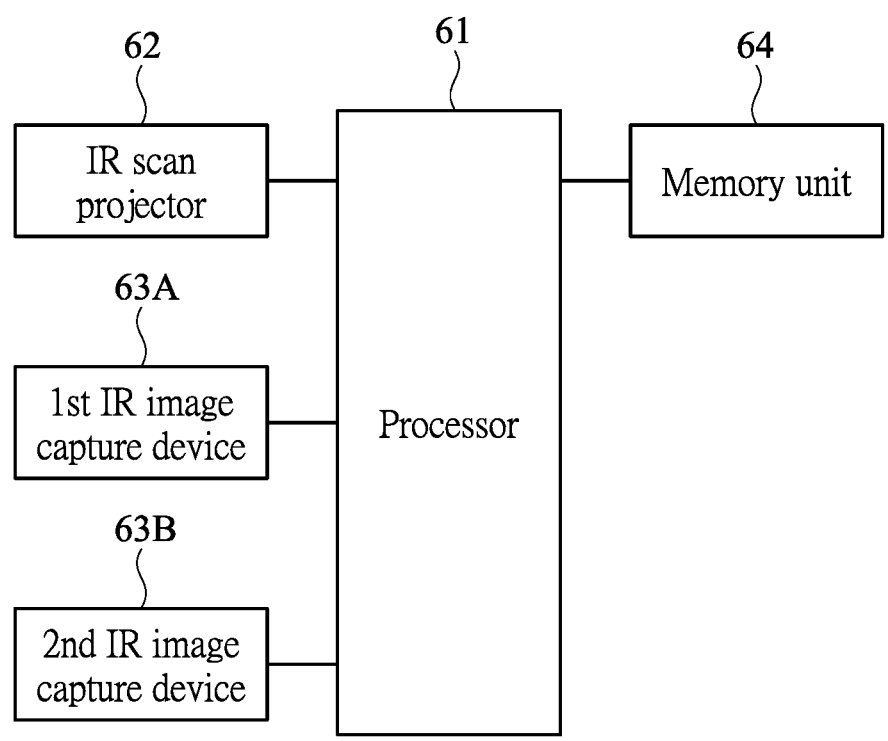
FIG. 6 shows a block diagram illustrating a 3D image capture system according to a second embodiment of the present invention.

FIG. 6 shows a block diagram illustrating a 3D image capture system 600 according to a second embodiment of the present invention. In the embodiment, the 3D image capture system 600 may include a processor 61 (e.g., an image processor), an infrared (IR) scan projector 62 and at least two IR image capture devices, for example, a first IR image capture device 63A and a second IR image capture device 63B. The processor 61 controls the IR scan projector 62 to project IR rays, and controls the first IR image capture device 63A and the second IR image capture device 63B to capture images, according to which 3D information may be obtained. The 3D image capture system 600 of the embodiment may also include a memory unit 64 configured to store computer programs executable by the processor 61 and the obtained 3D information. The memory unit 64 may include a memory device such as dynamic random-access memory (DRAM), static random-access memory (SRAM) or other memory devices adaptable to store programs and 3D information.

Figure 1B:
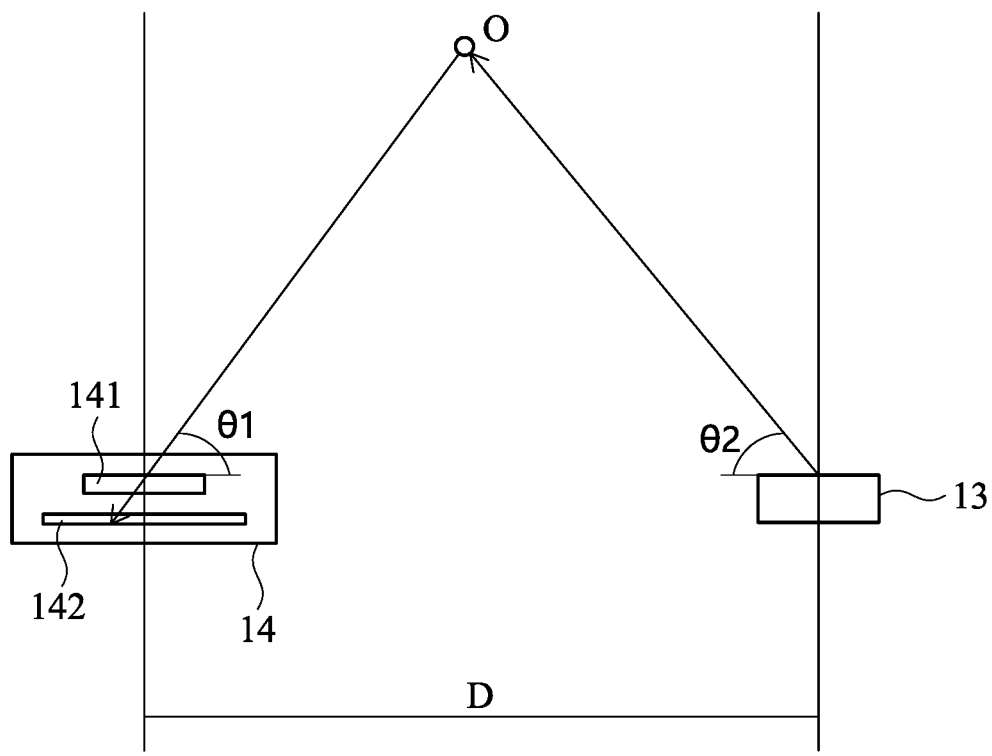
FIG. 1B shows a schematic diagram illustrating another 3D camera.
Figure 1C:
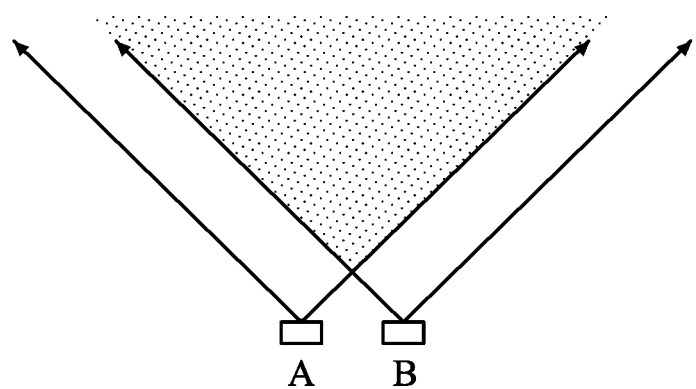
FIG. 1C schematically shows the capturing area of a 3D camera.
Figure 7A:
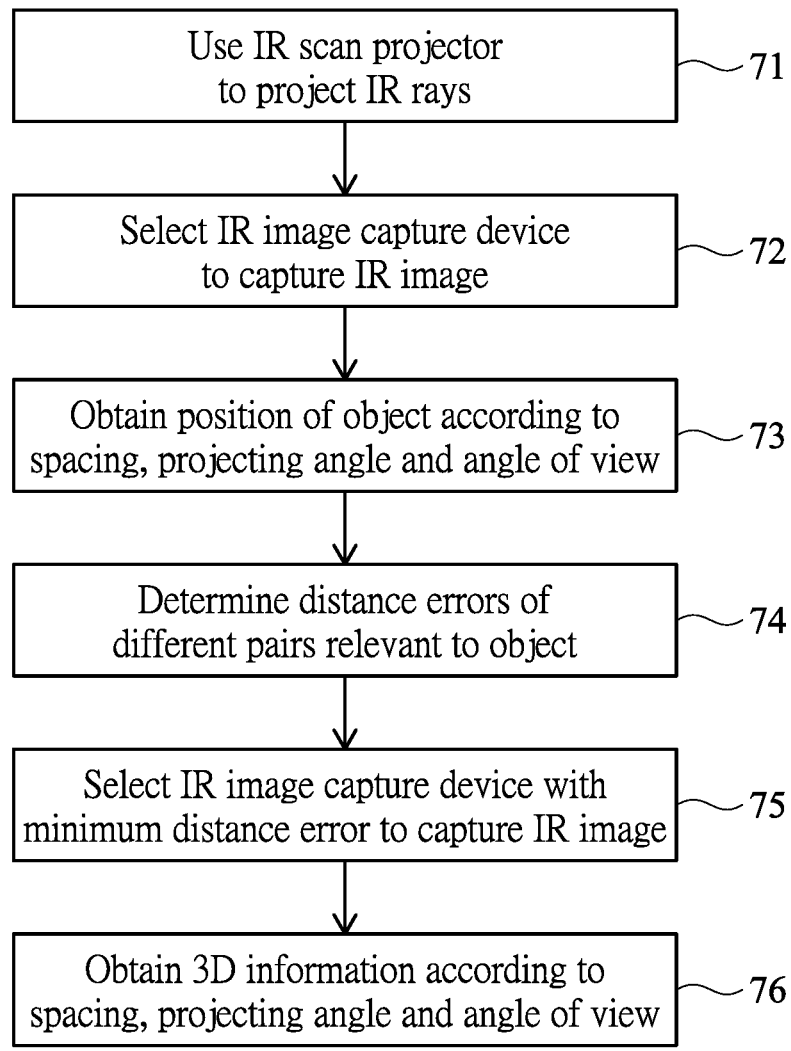
FIG. 7A shows a flow diagram illustrating a 3D image capture method according to the second embodiment of the present invention.

FIG. 7A shows a flow diagram illustrating a 3D image capture method 700A according to the second embodiment of the present invention. In step 71, the IR scan projector 62 is used to project IR rays. In step 72, an IR image capture device (e.g., the first IR image capture device 63A) is selected to capture an IR image. Next, in step 73, an angle of view of corresponding IR image capture device is determined according to the IR image. Accordingly, depth information (e.g., position) of an object may be obtained according to a projecting angle (of the IR scan projector 62), an angle of view (of the selected IR image capture device), and spacing between the IR scan projector 62 and the selected IR image capture device by using trigonometry (as exemplified in FIG. 1B). The measured position of the object obtained in step 73, however, may be different from a real position due to errors of the image capture system.

According to one aspect of the embodiment, in step 74, different pairs of IR image capture device (e.g., the second IR image capture device 63B) in companion with the IR scan projector are selected, and distance errors between the measured position and the real position relevant to the object are respectively determined by using techniques as described above. At least two different pairs of IR image capture device in companion with the IR scan projector 62 are selected in the embodiment. The number of pairs may be determined according to the number of IR image capture devices available in the 3D image capture system 600 and application requirements.

In step 75, a pair of IR image capture device in companion with the IR scan projector 62 with a minimum distance error is selected to capture an IR image. Next, in step 76, angle of view of corresponding IR image capture device is determined. Accordingly, depth information may be obtained according to the spacing between the IR scan projector 62 and the IR image capture device, the projecting angle (of the IR scan projector 62) and angle of view of the IR image capture device by using trigonometry (as exemplified in FIG. 1B).

Figure 7B:
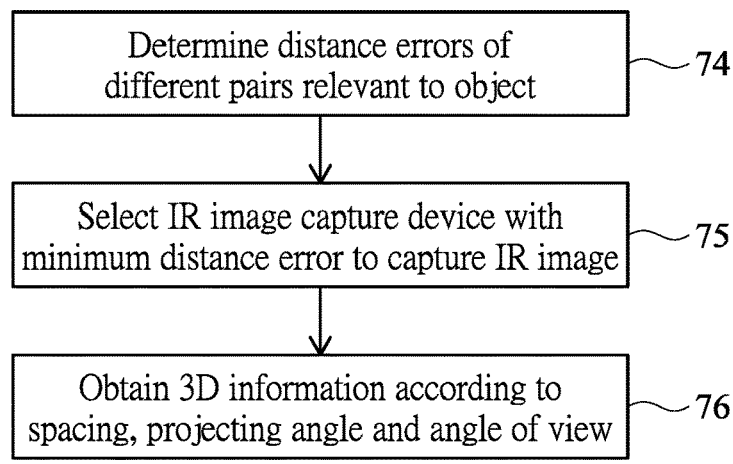
FIG. 7B shows a flow diagram illustrating a 3D image capture method according to a variant second embodiment of the present invention.

FIG. 7B shows a flow diagram illustrating a 3D image capture method 700B according to a variant second embodiment of the present invention. The present embodiment is similar to the embodiment shown in FIG. 7A with the exception that the position of the object is provided by other schemes or techniques. Therefore, the present embodiment includes no corresponding steps 71-73, while steps 74-76 of the present embodiment are the same as those of the embodiment shown in FIG. 7A.

Figure 7C:
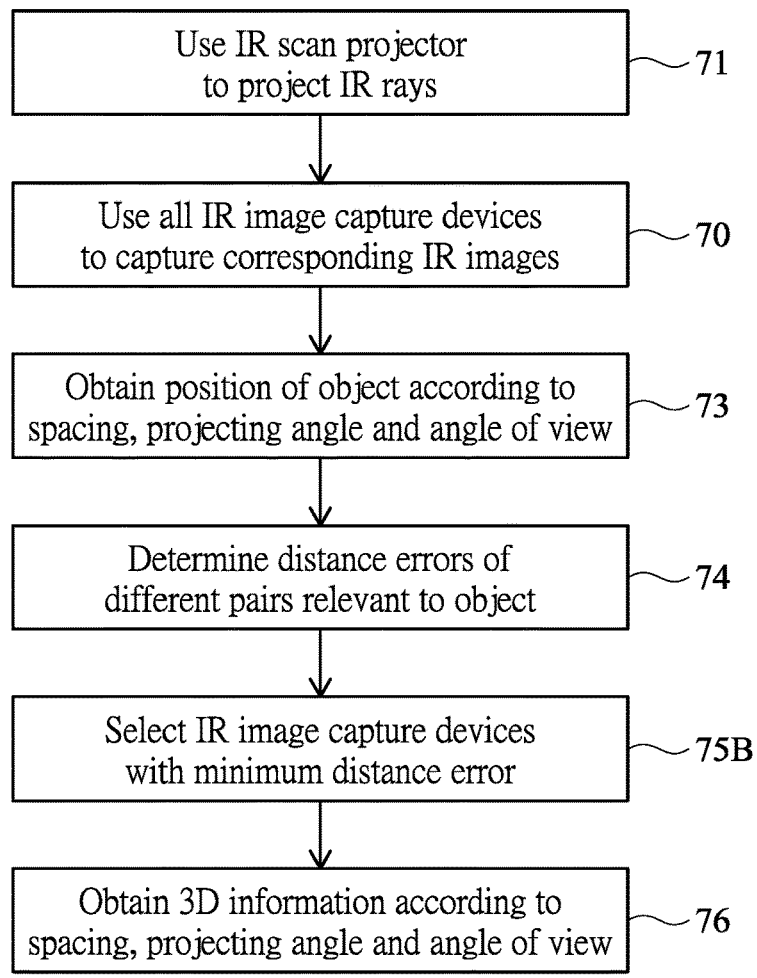
FIG. 7C shows a flow diagram illustrating a 3D image capture method according to another variant second embodiment of the present invention.

FIG. 7C shows a flow diagram illustrating a 3D image capture method 700C according to another variant second embodiment of the present invention. The present embodiment is similar to the embodiment shown in FIG. 7A with the exception as described below. According to the present embodiment, in step 71, the IR scan projector 62 is used to project IR rays. In step 70, all IR image capture devices are used to capture corresponding IR images. Next, in step 73, depth information (e.g., position) of an object may be obtained according to spacing between the IR scan projector 62 and an IR image capture device, a projecting angle (of the IR scan projector 62) and an angle of view (of the selected IR image capture device) by using trigonometry (as exemplified in FIG. 1B). In step 74, distance errors between the measured position and the real position relevant to the object are determined. Subsequently, in step 75B, an IR image capture device with a minimum distance error is selected. As the IR images of all the IR image capture devices are captured in step 70, step 75B in the present embodiment need not capture IR images again. Finally, in step 76, depth information may be obtained according to the spacing between the IR scan projector 62 and the IR image capture device, the projecting angle (of the IR scan projector 62) and angle of view of the IR image capture device by using trigonometry (as exemplified in FIG. 1B).

Figure 8:
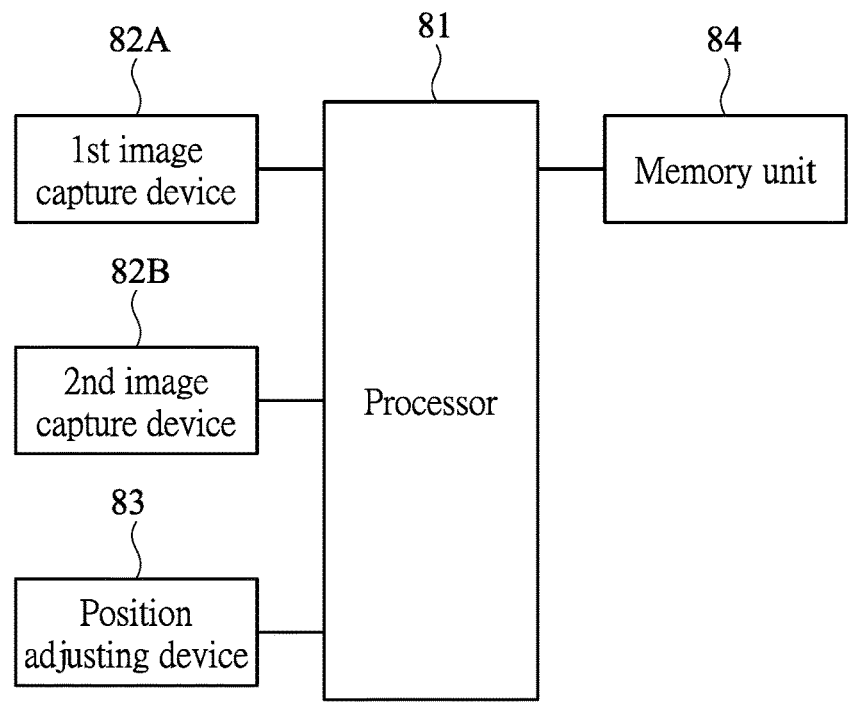
FIG. 8 shows a block diagram illustrating a 3D image capture system according to a third embodiment of the present invention.

FIG. 8 shows a block diagram illustrating a 3D image capture system 800 according to a third embodiment of the present invention. In the embodiment, the 3D image capture system 800 may include a processor 81 (e.g., an image processor) and at least two (visible light) image capture devices (for example, a first image capture device 82A and a second image capture device 82B). The processor 81 controls the first image capture device 82A and the second image capture device 82B to capture images, according to which 3D information may be obtained. The 3D image capture system 800 of the embodiment may also include a memory unit 84 configured to store computer programs executable by the processor 81 and the obtained 3D information. The memory unit 84 may include a memory device such as dynamic random-access memory (DRAM), static random-access memory (SRAM) or other memory devices adaptable to store programs and 3D information. According to one aspect of the embodiment, the 3D image capture system 800 may include a position adjusting device 83 configured to adjust a position of the second image capture device 82B, thus resulting in pairs of image capture devices with different spacing. Compared to the first embodiment (FIG. 2), the present embodiment may arrive at the same functions with fewer image capture devices (e.g., saving at least one image capture device).

Figure 9:
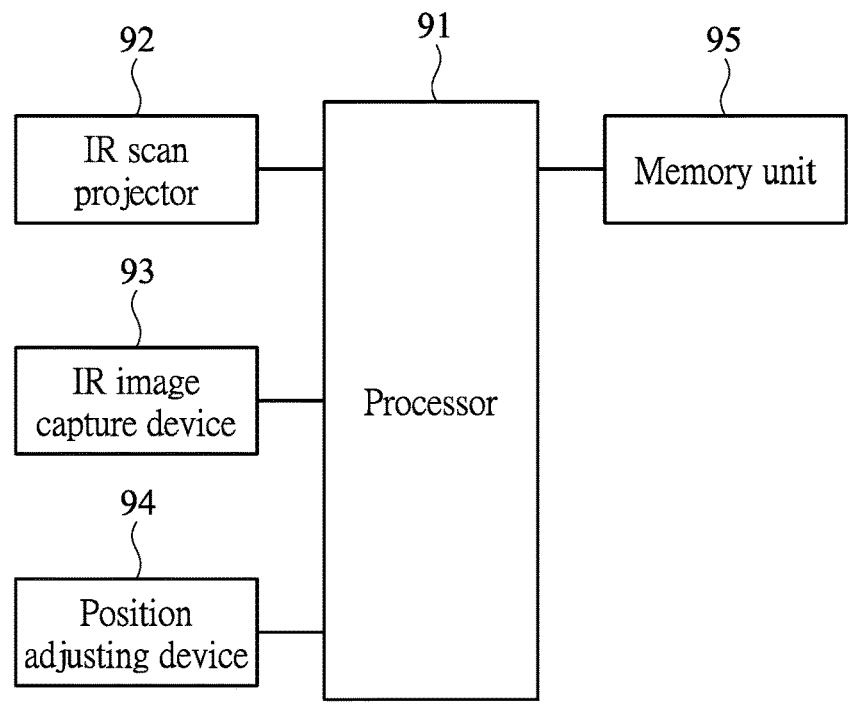
FIG. 9 shows a block diagram illustrating a 3D image capture system according to a fourth embodiment of the present invention.

FIG. 9 shows a block diagram illustrating a 3D image capture system 900 according to a fourth embodiment of the present invention. In the embodiment, the 3D image capture system 900 may include a processor 91 (e.g., an image processor), an infrared (IR) scan projector 92 and at least one IR image capture device 93. The processor 91 controls the IR scan projector 92 to project IR rays, and controls the IR image capture device 93 to capture images, according to which 3D information may be obtained. The 3D image capture system 900 of the embodiment may also include a memory unit 95 configured to store computer programs executable by the processor 91 and the obtained 3D information. The memory unit 95 may include a memory device such as dynamic random-access memory (DRAM), static random-access memory (SRAM) or other memory devices adaptable to store programs and 3D information. According to one aspect of the embodiment, the 3D image capture system 900 may include a position adjusting device 94 configured to adjust a position of the IR image capture device 93, thus resulting in pairs of IR image capture device in companion with the IR scan projector 92 with different spacing. Compared to the second embodiment (FIG. 6), the present embodiment may arrive at the same functions with fewer IR image capture devices (e.g., saving at least one IR image capture device).

Although specific embodiments have been illustrated and described, it will be appreciated by those skilled in the art that various modifications may be made without departing from the scope of the present invention, which is intended to be limited solely by the appended claims.

What is claimed is:

1. A three-dimensional (3D) image capture method, comprising:
    selecting a plurality of different pairs of image capture devices, at least one pair of which being used to capture images of an object, according to which a measured position of the object is obtained, and a distance between the measured position of the object and a real position of the object is defined as a distance error;
    selecting a pair of image capture devices with a minimum distance error; and
    obtaining 3D information according to spacing and angles of view of the selected pair of image capture devices.

2. The method of claim 1, wherein each said pair of image capture devices comprises two visible light image capture devices.

3. The method of claim 1, wherein each said pair of image capture devices comprises an infrared (IR) scan projector and an IR image capture device.

4. The method of claim 1, further comprising:
using the pair of image capture devices with the minimum distance error to capture corresponding images.

5. The method of claim 4, before determining the distance error, further comprising:
selecting one of the plurality of different pairs of image capture devices, and obtaining the measured position of the object according to spacing therebetween and corresponding angles of view.

6. The method of claim 4, before determining the distance error, further comprising:
providing the measured position of the object.

7. The method of claim 1, before determining the distance error, further comprising:
using all of the plurality of different pairs of image capture devices to capture corresponding images; and
obtaining the measured position of the object according spacing and corresponding angles of view of one of the plurality of different pairs of image capture devices.

8. The method of claim 1, further comprising:
dividing a field of view (FOV) into a plurality of areas;
determining distance errors of different pairs of image capture devices for each said area; and
selecting a pair of image capture devices with a minimum distance error for each said area.

9. The method of claim 1, further comprising:
determining vertices of overlapped FOVs of the different pairs of image capture devices; and
selecting a pair of image capture devices having a vertex of the overlapped FOV nearest to the subject to be captured.

10. The method of claim 1, further comprising:
adjusting a position of at least one of the image capture devices.

11. A three-dimensional (3D) image capture system, comprising:
at least three visible light image capture devices; and
a processor that controls the at least three image capture devices to capture images, according to which 3D information is obtained;
wherein the at least three image capture devices are paired into a plurality of different pairs of image capture devices, at least one pair of which being used to capture images of an object, according to which a measured position of the object is obtained, a distance between the measured position of the object and a real position of the object is defined as a distance error, a pair of image capture devices with a minimum distance error is selected, and 3D information is accordingly obtained.

12. The system of claim 11, further comprising:
a memory unit that stores computer programs executable by the processor and the obtained 3D information.

13. A three-dimensional (3D) image capture system, comprising:
at least two visible light image capture devices;
a position adjusting device for adjusting a position of at least one of said at least two image capture devices; and
a processor that controls the position adjusting device and the at least two image capture devices to capture images, according to which 3D information is obtained;
wherein the at least two image capture devices are adjusted and paired into a plurality of different pairs of image capture devices, at least one pair of which being used to capture images of an object, according to which a measured position of the object is obtained, a distance between the measured position of the object and a real position of the object is defined as a distance error, a pair of image capture devices with a minimum distance error is selected, and 3D information is accordingly obtained.

14. The system of claim 13, further comprising:
a memory unit that stores computer programs executable by the processor and the obtained 3D information.

15. A three-dimensional (3D) image capture system, comprising:
an infrared (IR) scan projector that projects IR rays;
at least two IR image capture devices; and
a processor that controls the at least two image capture devices to capture images, according to which 3D information is obtained;
wherein the at least two image capture devices are paired in companion with the IR scan projector into a plurality of different pairs of image capture devices, at least one pair of which being used to capture images of an object, according to which a measured position of the object is obtained, a distance between the measured position of the object and a real position of the object is defined as a distance error, a pair of image capture devices with a minimum distance error is selected, and 3D information is accordingly obtained.

16. The system of claim 15, further comprising:
a memory unit that stores computer programs executable by the processor and the obtained 3D information.

17. A three-dimensional (3D) image capture system, comprising:
an infrared (IR) scan projector that projects IR rays;
at least one IR image capture device;
a position adjusting device for adjusting a position of at least one of said at least one image capture device; and
a processor that controls the position adjusting device and the at least one image capture device to capture images, according to which 3D information is obtained;
wherein the at least one image capture device is adjusted and paired in companion with the IR scan projector into a plurality of different pairs of image capture devices, at least one pair of which being used to capture images of an object, according to which a measured position of the object is obtained, a distance between the measured position of the object and a real position of the object is defined as a distance error, a pair of image capture devices with a minimum distance error is selected, and 3D information is accordingly obtained.

18. The system of claim 17, further comprising:
a memory unit that stores computer programs executable by the processor and the obtained 3D information.

* * * * *